United States Patent
Shan

(10) Patent No.: US 10,794,988 B2
(45) Date of Patent: Oct. 6, 2020

(54) METHOD OF IMPLEMENTING SPREAD SPECTRUM TECHNIQUES IN AN AUTOMOTIVE RADAR WITH WIRELESS COMMUNICATION CAPABILITIES

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 114 days.

(21) Appl. No.: 16/249,351

(22) Filed: Jan. 16, 2019

(65) Prior Publication Data
US 2019/0219667 A1    Jul. 18, 2019

Related U.S. Application Data

(63) Continuation-in-part of application No. 16/248,761, filed on Jan. 15, 2019, and a continuation-in-part of application No. 16/242,958, filed on Jan. 8, 2019.
(Continued)

(51) Int. Cl.
| | |
|---|---|
| *G01S 7/00* | (2006.01) |
| *H04B 7/0413* | (2017.01) |
| *H04B 1/69* | (2011.01) |
| *H04W 4/40* | (2018.01) |
| *G01S 13/931* | (2020.01) |
| *H04W 24/08* | (2009.01) |

(Continued)

(52) U.S. Cl.
CPC .............. *G01S 7/006* (2013.01); *G01S 13/42* (2013.01); *G01S 13/931* (2013.01); *H04B 1/69* (2013.01); *H04B 7/0413* (2013.01); *H04W 4/40* (2018.02); *H04W 24/08* (2013.01); *G01S 2013/9316* (2020.01); *H04B 1/707* (2013.01); *H04W 88/08* (2013.01)

(58) Field of Classification Search
CPC ........ G01S 7/006; G01S 13/42; G01S 13/931; G01S 2013/9316; H04B 7/0413; H04B 1/69; H04B 1/707; H04W 4/40; H04W 24/08; H04W 88/08
USPC .............................. 342/107, 175, 32, 27, 104
See application file for complete search history.

(56) References Cited

U.S. PATENT DOCUMENTS

| | | | | |
|---|---|---|---|---|
| 2014/0225763 | A1* | 8/2014 | Kavaler | B60W 30/06 342/70 |
| 2015/0282026 | A1* | 10/2015 | Gupta | H04L 1/0026 370/331 |

(Continued)

*Primary Examiner* — Bo Fan

(57) ABSTRACT

A method of implementing spread spectrum techniques in an automotive radar with wireless communication capabilities enables an anti-jammer radar capable of overcoming channel noise. The method is provided with a MIMO radar and at least one base station. The MIMO radar transmits the initial uplink signal and receives an ambient signal containing a reflected uplink signal and the downlink signal. The initial uplink signal is encrypted to overcome channel noise and jamming signals. The downlink signal is used to establish wireless communication between the base station and the MIMO radar. As such, the downlink signal is filtered and processed from the ambient signal. Similarly, the reflected downlink signal is also filtered from the ambient signal. Finally, the MIMO radar decrypts the reflected uplink signal to detect a plurality of targets and derive spatial positioning data for each target.

9 Claims, 14 Drawing Sheets

Related U.S. Application Data

(60) Provisional application No. 62/617,723, filed on Jan. 16, 2018, provisional application No. 62/617,962, filed on Jan. 16, 2018, provisional application No. 62/616,844, filed on Jan. 12, 2018, provisional application No. 62/618,735, filed on Jan. 18, 2018, provisional application No. 62/619,204, filed on Jan. 19, 2018, provisional application No. 62/628,436, filed on Feb. 9, 2018, provisional application No. 62/630,416, filed on Feb. 14, 2018, provisional application No. 62/754,448, filed on Nov. 1, 2018, provisional application No. 62/756,318, filed on Nov. 6, 2018.

(51) Int. Cl.
*G01S 13/42* (2006.01)
*H04W 88/08* (2009.01)
*H04B 1/707* (2011.01)

(56) References Cited

U.S. PATENT DOCUMENTS

| | | | |
|---|---|---|---|
| 2017/0192089 A1* | 7/2017 | Parker | F41H 13/0075 |
| 2017/0288765 A1* | 10/2017 | Khlat et al. | H04B 7/08 |
| 2017/0295007 A1* | 10/2017 | Cheng | H04L 5/00 |
| 2017/0310436 A1* | 10/2017 | Nuzman et al. | H04L 5/00 |
| 2017/0331663 A1* | 11/2017 | Moradi et al. | H04L 27/34 |
| 2018/0376366 A1* | 12/2018 | Singh | H04W 88/08 |

* cited by examiner

Parallely decoding each received beam with the spread spectrum coding scheme during step (H)

Standardizing the time delay between each received beam and the corresponding transmitted beam in accordance to a PN time period with the MIMO radar

METHOD OF IMPLEMENTING SPREAD SPECTRUM TECHNIQUES IN AN AUTOMOTIVE RADAR WITH WIRELESS COMMUNICATION CAPABILITIES The current application claims a priority to the U.S. Provisional Patent application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

The current application also claims a priority to a U.S. non-provisional application Ser. No. 16/242,958 filed on Jan. 8, 2019. The U.S. non-provisional application Ser. No. 16/242,958 claims a priority to a U.S. provisional application Ser. No. 62/616,844 filed on Jan. 12, 2018.

The current application also claims a priority to the U.S. Provisional Patent application Ser. No. 62/618,735 filed on Jan. 18, 2018.

The current application also claims a priority to the U.S. Provisional Patent application Ser. No. 62/619,204 filed on Jan. 19, 2018.

The current application also claims a priority to the U.S. Provisional Patent application Ser. No. 62/628,436 filed on Feb. 9, 2018.

The current application also claims a priority to the U.S. Provisional Patent application Ser. No. 62/630,416 filed on Feb. 14, 2018.

The current application also claims a priority to the U.S. Provisional Patent application Ser. No. 62/754,448 filed on Nov. 1, 2018.

The current application also claims a priority to the U.S. Provisional Patent application Ser. No. 62/756,318 filed on Nov. 6, 2018.

FIELD OF THE INVENTION

The present invention generally relates to a method of implementing spread spectrum techniques in an automotive radar with wireless communication capabilities. More specifically, the method of present invention utilizes spread-spectrum encoded signals to overcome enable an anti-jamming radar capable of overcoming channel noise.

BACKGROUND OF THE INVENTION

Vehicle wireless communication networks and auto radar for automatic driving vehicle have been fast-growing areas of interest for many automobile and wireless enterprises. These markets are among fastest growing markets in the world.

Recently, the development of automobile radar as a sensing tool for advanced driver assistance systems (ADAS) and autonomous driving is the focus of automobile manufactures and the artificial intelligence (AI) research and development industry.

Vehicle communication networks such as Vehicle-to-Everything (V2X) are a driving force behind the 5G, 4G-LTE and WiGig mobile standards, product developments, and applications. A V2X network connects vehicles with the surrounding communication nodes such as ground points, pedestrians, mobile or static base stations, and/or traffic infrastructure such as police stations, toll booth, traffic lights, etc.

As herein used, V2X represents vehicles to everything (vehicles, ground point, Internet, police station, toll booth, etc.) communication and de-spread is defined as spread spectrum coding and decoding. With the growth of the auto radar market, more automobiles with radar functions will propagate on the roads. Radar signals can often interfere with one another and hinder vehicle's ability to sense targets. Therefore, a new anti-jammer radar is needed.

The present invention is a MIMO antenna array capable of directional transmitting and receiving which will improve auto radar performance. The MIMO antenna arrays transmits spread spectrum encoded signals that are resistant to jamming and are secured. The MIMO radar also dispreads a received spread spectrum signal to provide processing gain and to overcome the channel noise and jamming signals. Further, this provides a powerful time delay estimation method as long as the pseudorandom (PN) code rate meets the time delay resolution requirement.

DETAILED DESCRIPTION OF THE INVENTION

All illustrations of the drawings are for the purpose of describing selected versions of the present invention and are not intended to limit the scope of the present invention.

The present invention is a method of implementing spread spectrum techniques in an automotive radar with wireless communication capabilities. More specifically, the present invention utilizes spread spectrum techniques to encode and decode radar signals used to derive distance, speed, direction-of-arrive (DOA) estimates of radar targets. The spread spectrum techniques can be applied to a single target, as well as multiple targets.

Figure 1:
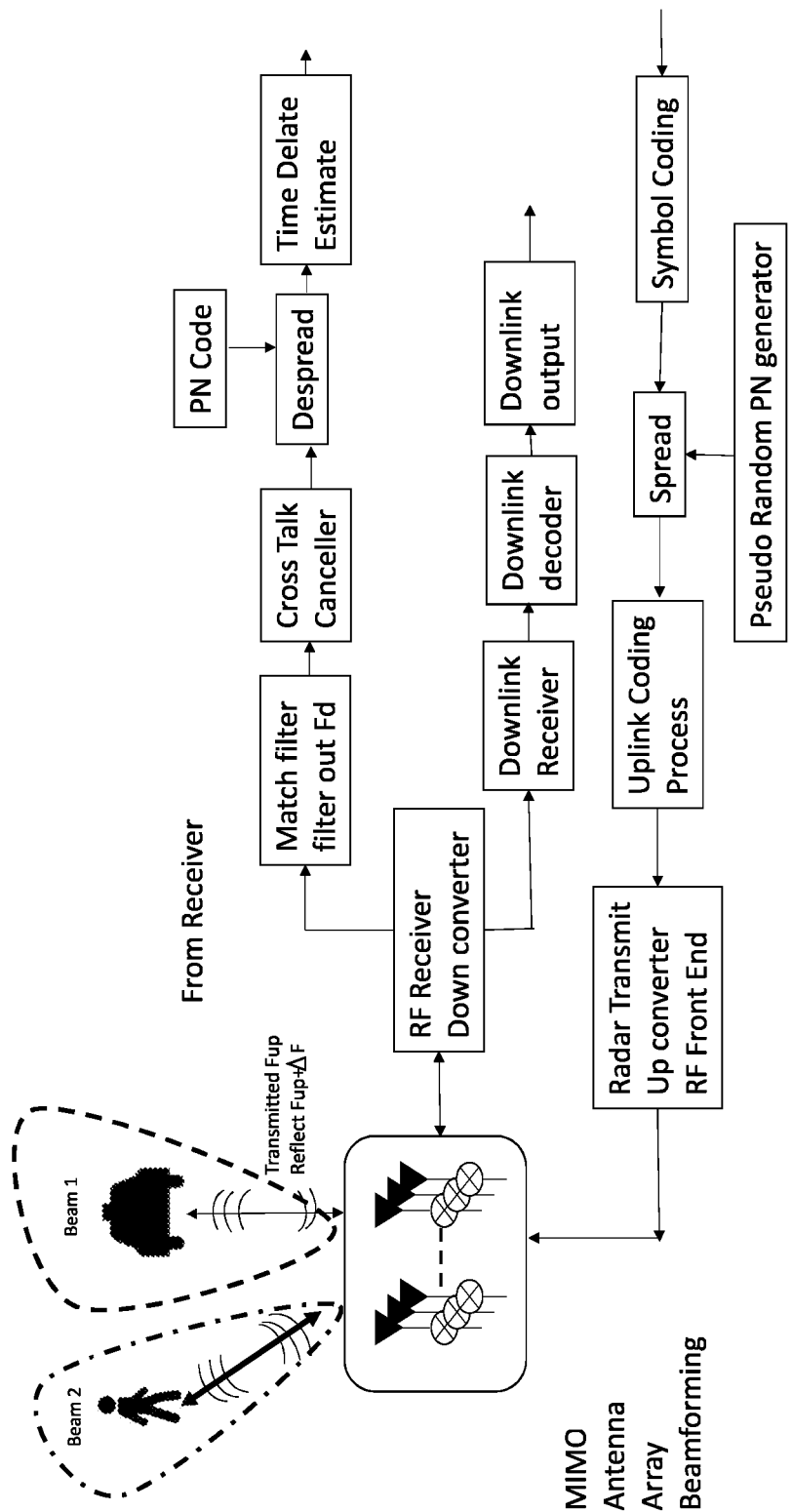
FIG. 1 is a schematic diagram of the system of the present invention.
Figure 2:
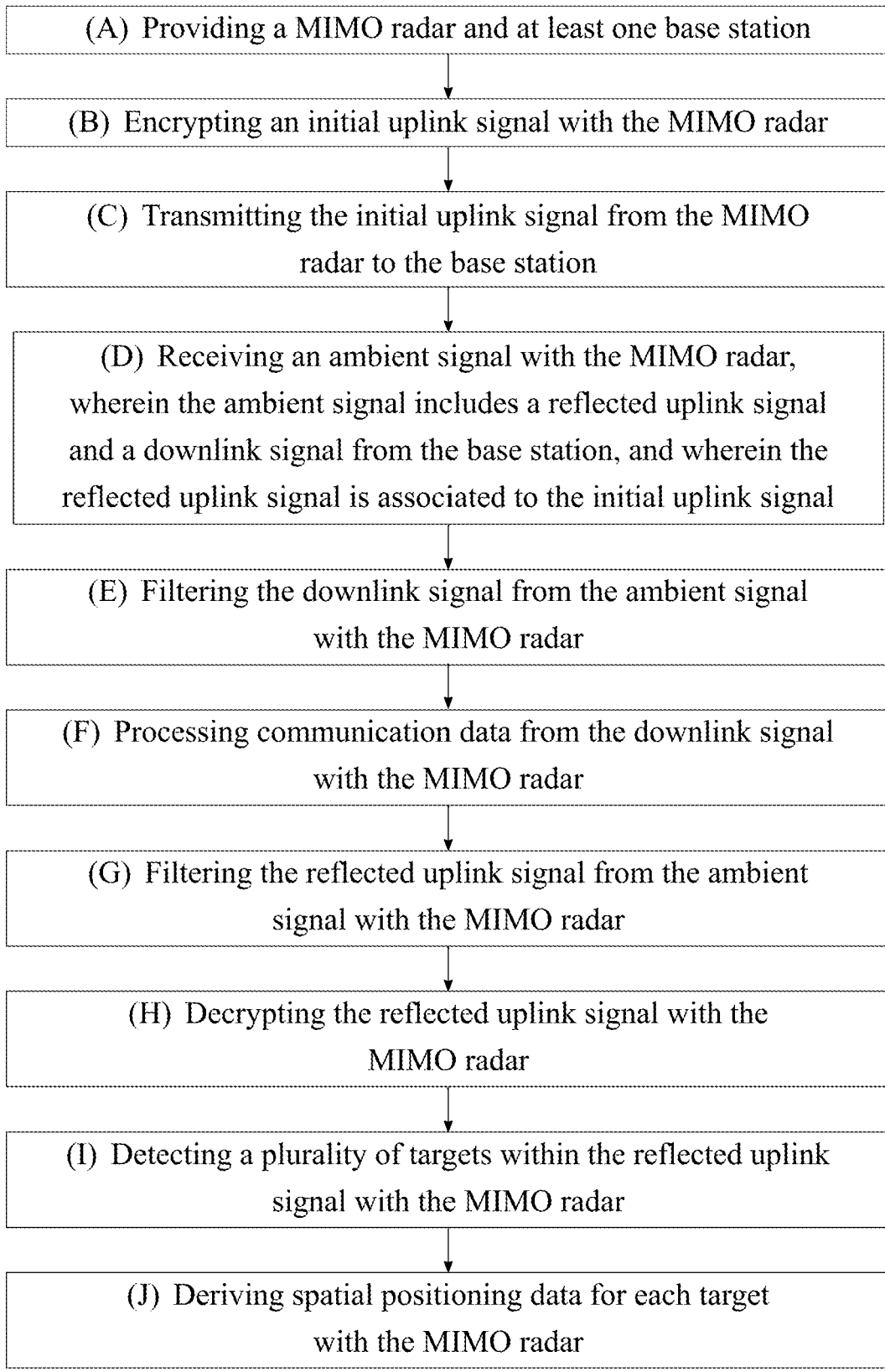
FIG. 2 is a flowchart of the overall process for the method of the present invention.

Referring to FIG. 1 and FIG. 2, the preferred embodiment of the present invention is provided with a MIMO radar and at least one base station (Step A). The preferred MIMO radar is an advanced type of phased array radar comprising a plurality of antenna arrays, each of which can be independently directed. In the preferred implementation, the MIMO radar is provided as part of a vehicle's advanced driver assistance system (ADAS) or autonomous driving systems. In particular, the preferred MIMO radar serves a dual-purpose role as a networking device for connecting to base stations and wireless terminals and as a conventional radar for generating speed, distance, and DOA estimates for a plurality of targets. Preferably, the radar signals are encrypted to overcome channel noise and jamming signals. As such, the MIMO radar encrypts an initial uplink signal (Step B). The initial uplink signal is used to transmit data and establish communication with the base station. In the preferred embodiment, the MIMO radar uses spread spectrum coding and decoding to provide processing gain, filter noise, and increase the signal-to-noise ratio (SNR). The preferred spread spectrum techniques may include frequency-hopping spread spectrum (FHSS), direct-sequence spread spectrum (DSSS), time-hopping spread spectrum (THSS), chirp spread spectrum (CSS), and/or combinations of these techniques. In another embodiment of the present invention, the initial uplink signal may be encoded in an alternate coding technique well-known in the relevant arts.

To achieve this, the MIMO radar transmits the initial uplink signal to the base station (Step C). The preferred base station is a fixed or mobile communication platform that relays information to and from the MIMO radar. The MIMO radar receives an ambient signal, wherein the ambient signal includes a reflected uplink signal and a downlink signal from the base station, wherein the reflected uplink signal is associated to the initial uplink signal, and wherein the reflected uplink signal originates from objects surrounding the MIMO radar (Step D). More specifically, the ambient signal includes the reflected uplink signal, the downlink signal, and any other stray signals surrounding the vehicle. Preferably, the reflected uplink signal refers to echoes of the initial uplink signal reflected by objects in the scan range. The objects, as herein referred to, are objects surrounding the vehicle such as other vehicles, pedestrians, and/or buildings on the side of the road. In contrast, the downlink signal is generated by the base station and sent directly from the base station to the MIMO radar. Accordingly, the MIMO radar filters the downlink signal from the ambient signal (Step E). Preferably, the downlink signal and the reflected uplink signal are separated using filter techniques including, but not limited to, match filter, band pass filter, digital filter bank even in the collinear case (i.e. where the base station and the radar target are colinearly located to each other). Once filtered, the downlink signal can be converted into a data output which is interpreted by the vehicle's onboard computers. As such, the MIMO radar processes communication data from the downlink signal (Step F). The communication data includes, but is not limited to, over-the-air (OTA) updates, audio/video files, and/or information. Similar to the downlink signal, the MIMO radar also filters the reflected uplink signal from the ambient signal (Step G). Subsequently, the MIMO radar decrypts the reflected uplink signal (Step H). In alternate embodiments of the present invention, the MIMO radar may perform the filtering and decoding steps simultaneously. In the preferred embodiment, the reflected uplink signal is encrypted using spread spectrum techniques. As such, the reflected uplink signal must be despread after reception to be processed. This allows the MIMO radar to detect a plurality of targets within the reflected uplink signal (Step I). The plurality of targets each has a radar signature that matches the radar signature of objects that may be encountered by the vehicle. The MIMO radar may use a database of stored radar signature to correctly identify the plurality of targets within the reflected uplink signal. Further, the MIMO radar derives spatial positioning data for each target (Step J). As mentioned, the spatial positioning data may include speed, distance, and DOA estimates for each of the targets.

Figure 3:
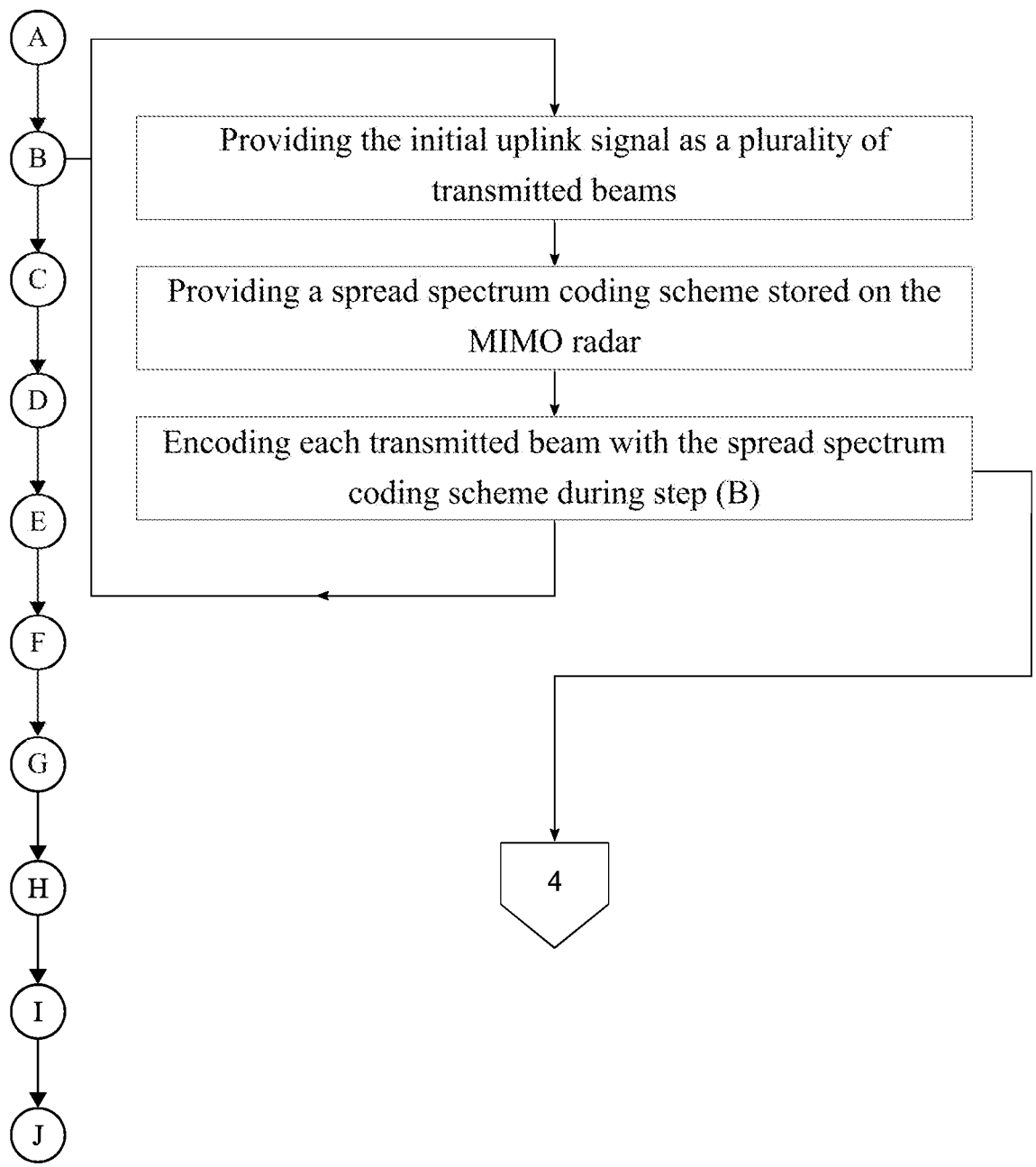
FIG. 3 is a flowchart of a subprocess for encoding the transmitted beam with the spread spectrum coding scheme.

Referring to FIG. 3, in selected embodiments, the initial uplink signal may be transmitted as an omni-directional signal or a plurality of beams, each of which can be steered towards a desired direction. In the preferred embodiment, the initial uplink beam is provided as a plurality of transmitted beams. Preferably, the plurality of transmitted beams is transmitted sequentially in a radial direction about the MIMO radar. This gives the MIMO radar 360-degree coverage about the vehicle. To reduce noise and increase signal resolution, a spread spectrum coding scheme stored on the MIMO radar is provided to overcome channel noise and jamming signals. This provides a powerful time delay estimation method if the pseudorandom code period meets the time delay resolution requirement. As such, each transmitted beam is encoded with the spread spectrum coding scheme during Step B. The spread spectrum encryption method relies on spreading the initial uplink signal in the frequency domain, thereby giving the initial uplink signal a wider bandwidth.

Figure 4:
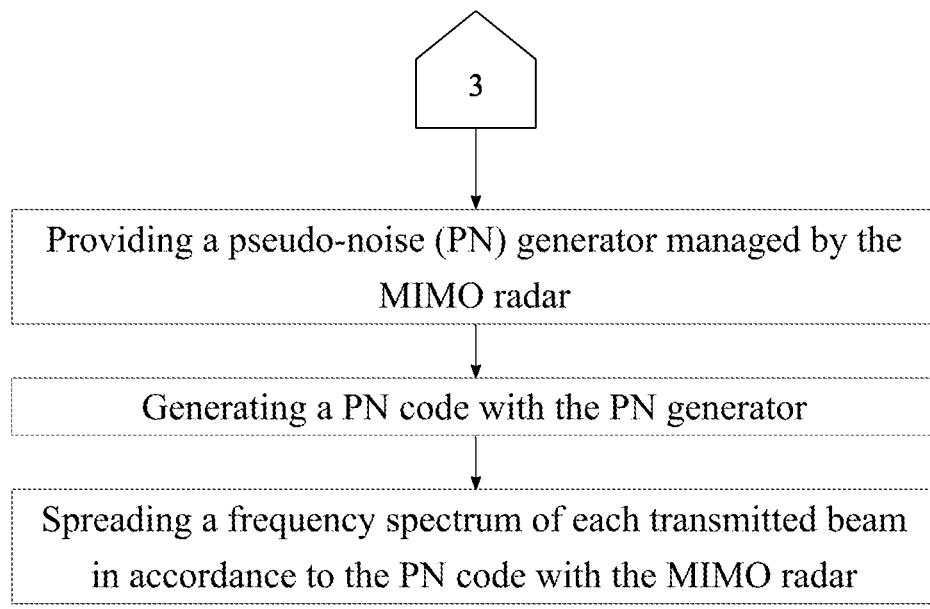
FIG. 4 is a flowchart of a subprocess for encoding the transmitted beam in accordance to a PN code.
Figure 5:
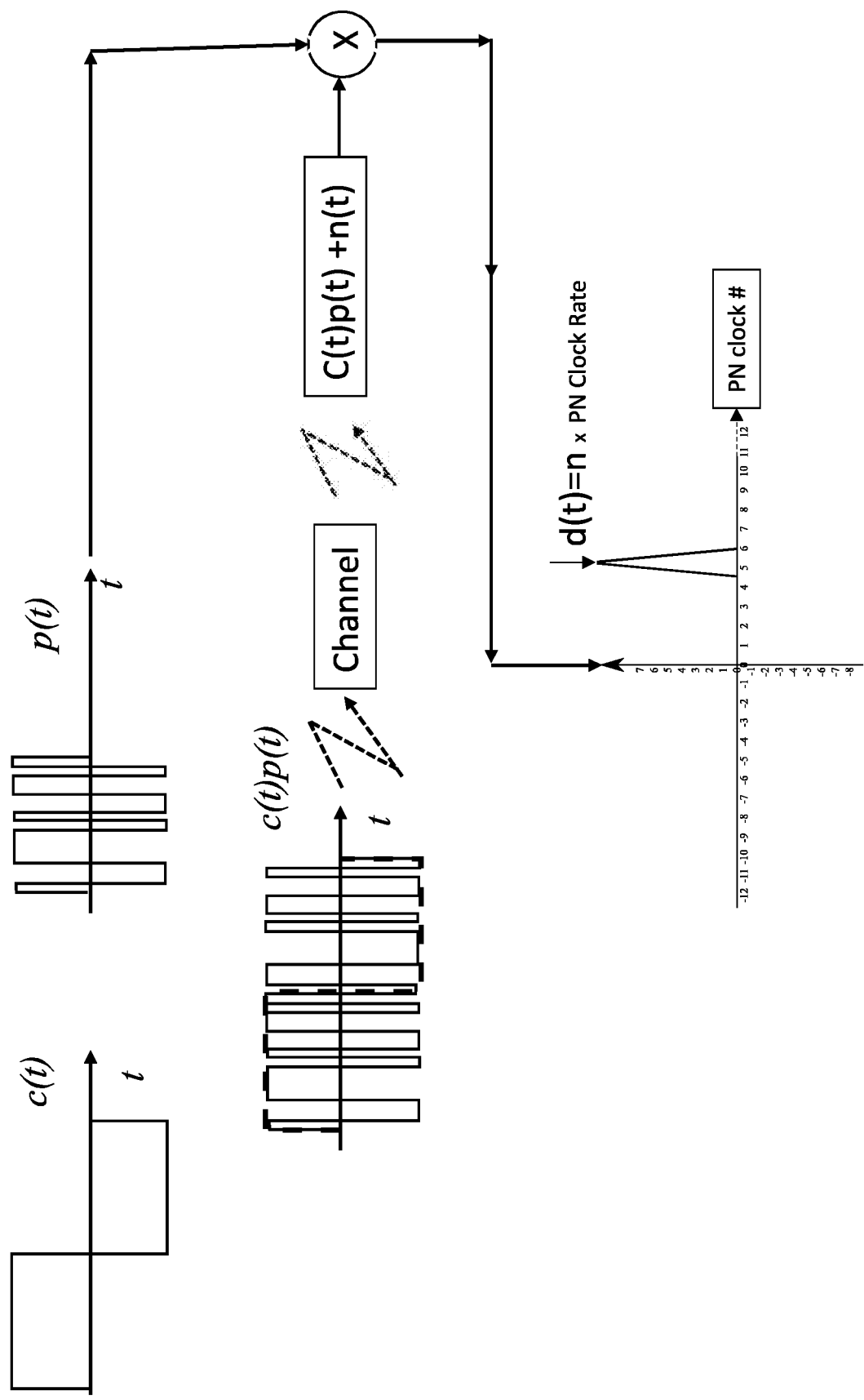
FIG. 5 is an illustration of spread spectrum coding and decoding being applied to the transmitted beam and the received beam, respectively.

Referring to FIG. 4, in the preferred embodiment, the spread spectrum coding scheme is provided with a pseudo-noise (PN) generator managed by the MIMO radar so that the PN generator is able to generates a PN code. Subsequently, the PN code is used to spread the frequency spectrum of the plurality of transmitted beams during transmission. As can be seen in FIG. 5, the PN code transforms the plurality of transmitted beams into a signal similar to noise which is resistant to jamming and can only be identified with the PN code. As such, MIMO radar spreads a frequency spectrum of each transmitted beam in accordance to the PN code. Preferably, the PN code repeats itself after the passage of a PN time period. In one possible embodiment, the spread spectrum coding scheme may be applied according to the DSSS technique.

In this embodiment, the PN time period is used to synchronize a transmitting end and a receiving end of the MIMO radar. In particular, the receiving end actively searches for the plurality of received beams having the same frequencies as those encoded by the PN code. To further refine the search, the plurality of received beams must also have the same time period as the plurality of transmitted beams. Thus, at the start of a new PN time period, the receiving end ignores signals having the preceding PN time period. Further, in this embodiment, the PN code is applied uniformly to the plurality of transmitted beams. The plurality of transmitted beams is separated by the DOA information. The PN time period is also a convenient way of measuring the time delay of the plurality of received beams since the PN time period is measured in whole number intervals.

Figure 6:
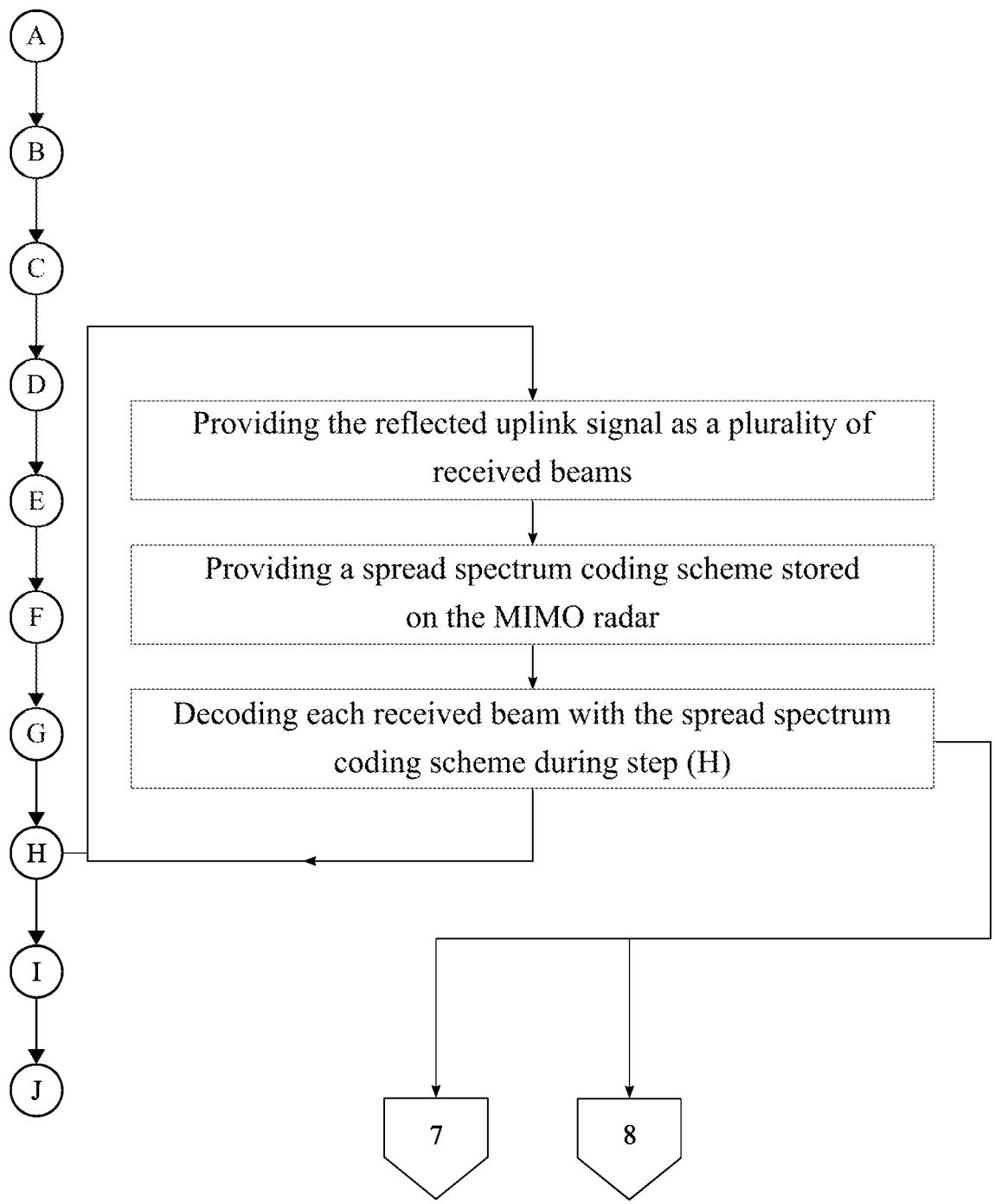
FIG. 6 is a flowchart of a subprocess for decoding the plurality of received beams with the spread spectrum coding scheme.

Referring to FIG. 6, in this embodiment, each of the plurality of transmitted beams contacts an object in the vicinity of the vehicle and is subsequently reflected towards the MIMO radar. As such, the reflected uplink signal is provided as a plurality of received beams. Preferably, each of the plurality of received beams corresponds to a transmitted beam. This is achieved by inspecting the DOA estimate for each received beam. Accordingly, each received beam can be matched to the correct transmitted beam. To further reduce noise and correctly identify the plurality of received beams, the MIMO radar uses the spread spectrum coding scheme. The spread spectrum coding scheme is used to identify the plurality of received beams as the reflected uplink signal. This is achieved by filtering the ambient signal with the spread spectrum coding scheme to separate the plurality of received beams. Accordingly, each received beam is decoded with the spread spectrum coding scheme during Step H. Preferably, this step is performed by an autocorrelator provided within the MIMO radar. The autocorrelator can correlate the reflected uplink signal with the initial uplink signal. In one embodiment, the autocorrelator may filter the each received beam from the ambient signal as part of the decoding process. In another embodiment, the autocorrelator may perform decoding once each received beam is filtered from the ambient signal.

Figure 7:
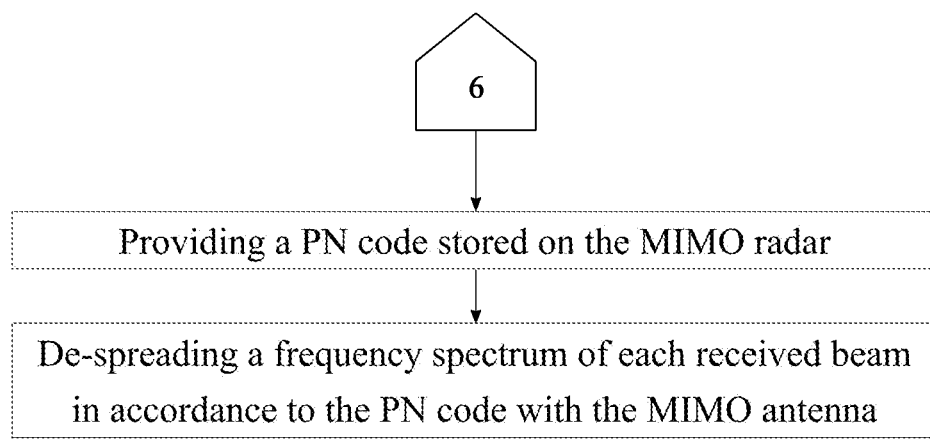
FIG. 7 is a flowchart of a subprocess for de-spreading the frequency spectrum of each received beam with the PN code.

Referring to FIG. 7, as with the encrypting process, the decrypting process also relies on the PN code. Accordingly, the PN code is stored in the MIMO radar. More specifically, the MIMO radar filters the ambient signal according to the PN time period of the plurality of transmitted beams. This is because the plurality of received beams is in the same PN time period as the plurality of transmitted beams. Thus, the plurality of received beams can be identified by filtering the ambient signal for signals encoded with the PN code and having the same time period as the transmitted beam. Once identified, the MIMO radar de-spreads the frequency spectrum of each received beam in accordance to the PN code.

Figure 8:
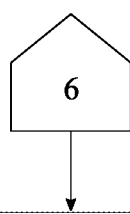
FIG. 8 is a flowchart of a subprocess for decoding the plurality of received beams simultaneously to calculate the time delay.
Figure 9:
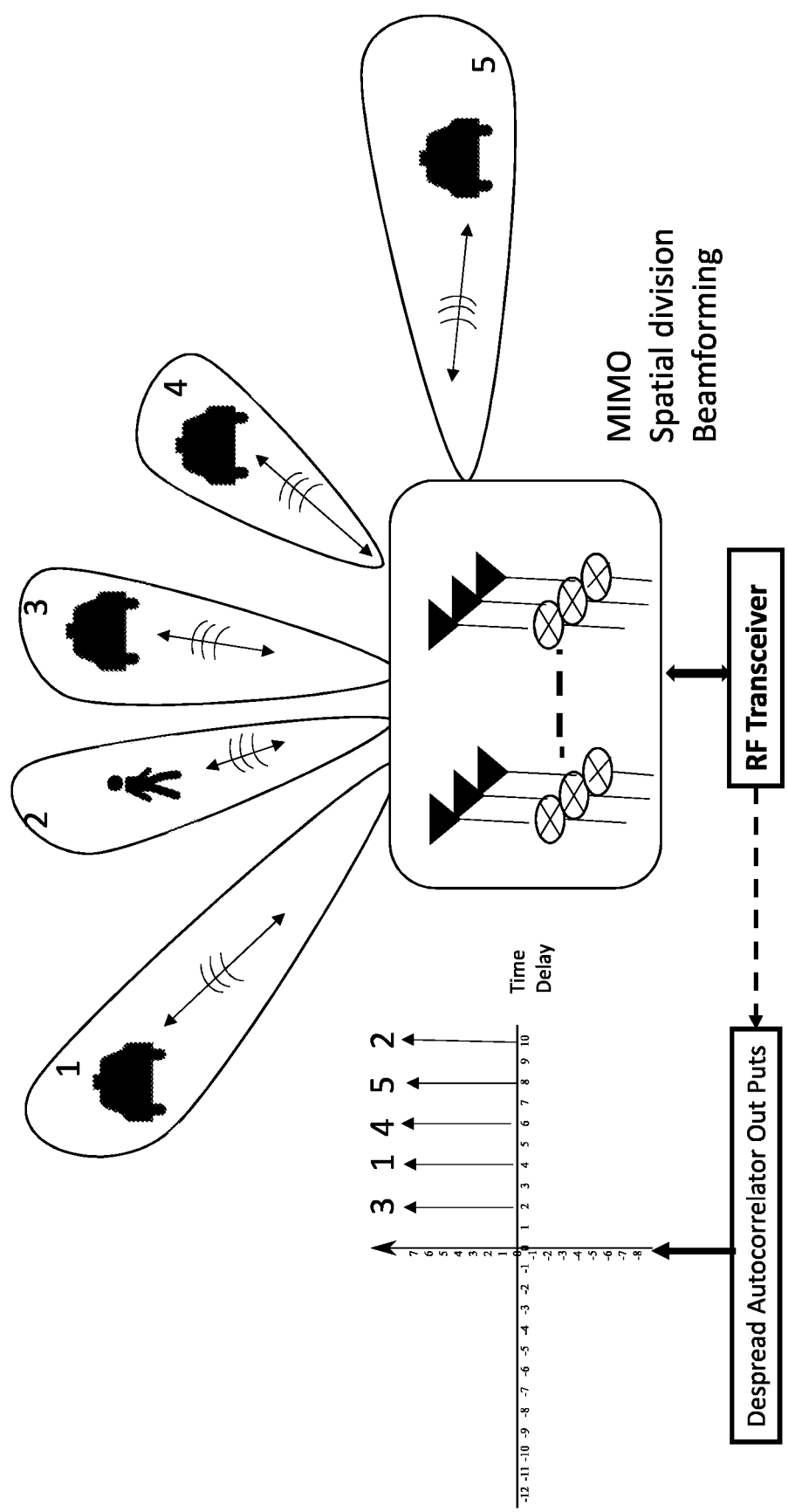
FIG. 9 is an illustration of the plurality of targets being de-spread parallelly to obtain the time delay.

Referring to FIG. 8 and FIG. 9, in this embodiment, each received beam is parallelly decoded with the spread spectrum coding scheme during Step H. As such, MIMO radar de-spreads the plurality of received signals, simultaneously. Once the plurality of received beams is de-spread, the MIMO radar determines the speed, distance, and DOA of the corresponding target. In an alternate embodiment, the plurality of received signals may be de-spread sequentially according to the time of detection.

Figure 10:
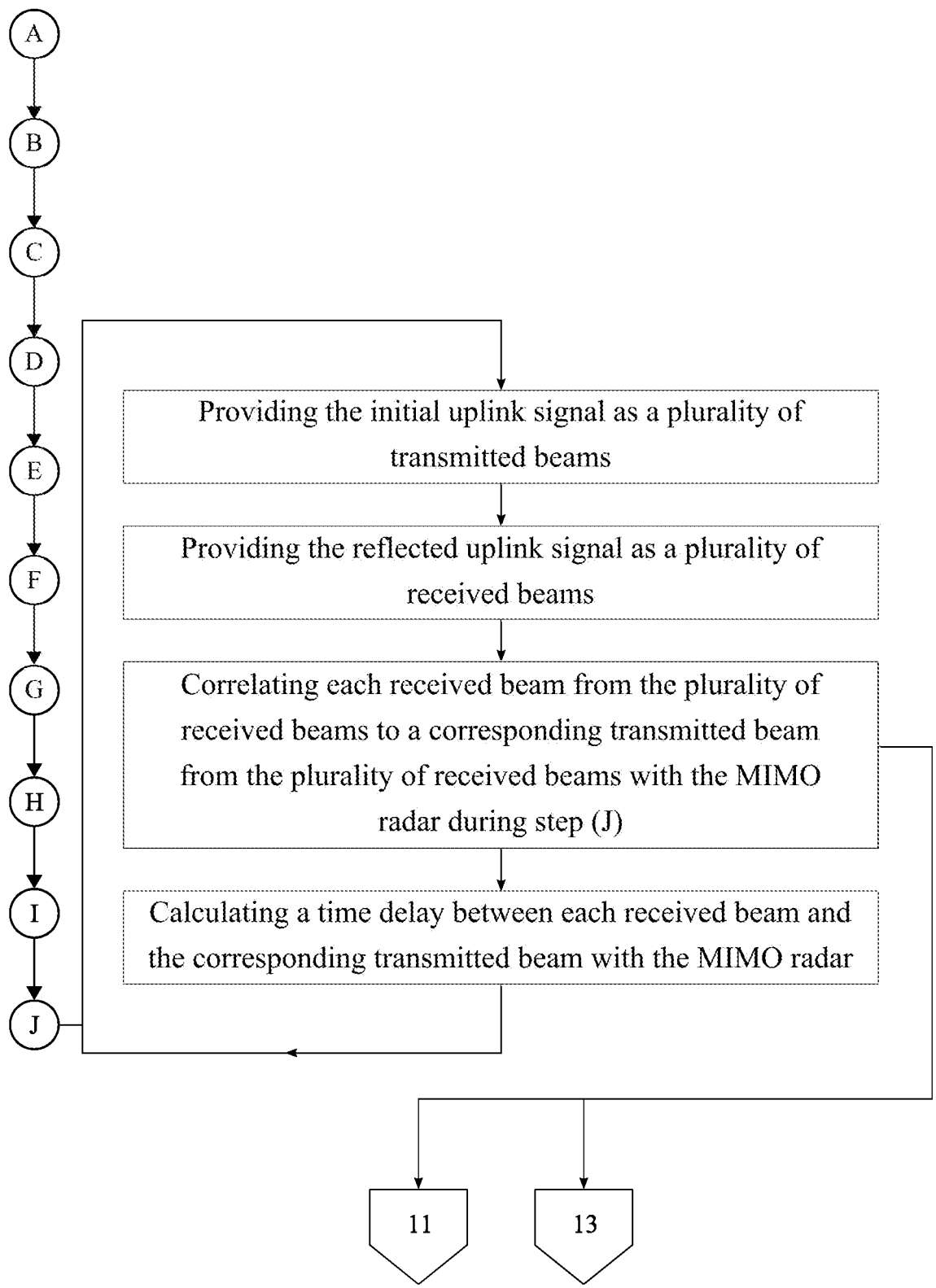
FIG. 10 is a flowchart of a subprocess for correlating each received beam to a corresponding transmitted beam to calculate the time delay.

Referring to FIG. 10, in the preferred embodiment, the MIMO radar receives and processes the reflected uplink signal to estimate the distance, speed, and direction of arrival estimates for the corresponding target. Prior to this step, the MIMO radar correlates each received beam from the plurality of received beams to a corresponding transmitted beam from the plurality of received beams during Step J. As mentioned, this may be achieved by encoding the plurality of transmitted beams during transmission to reduce noise and filter out the ambient signal from the received beams at the reception end. Subsequently, the MIMO radar calculates a time delay between each received beam and the corresponding transmitted beam. The time delay of the received beam allows for calculation of the distance and speed of the corresponding target. Alternate signal characteristics may be utilized to derive addition information about the corresponding target. For example, the phase shift of the received beam may signify that the target is moving towards or away from the MIMO radar.

Figure 11:
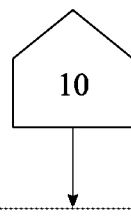
FIG. 11 is a flowchart of a subprocess for standardizing the time delay between each received beam and the corresponding transmitted beam.
Figure 12:
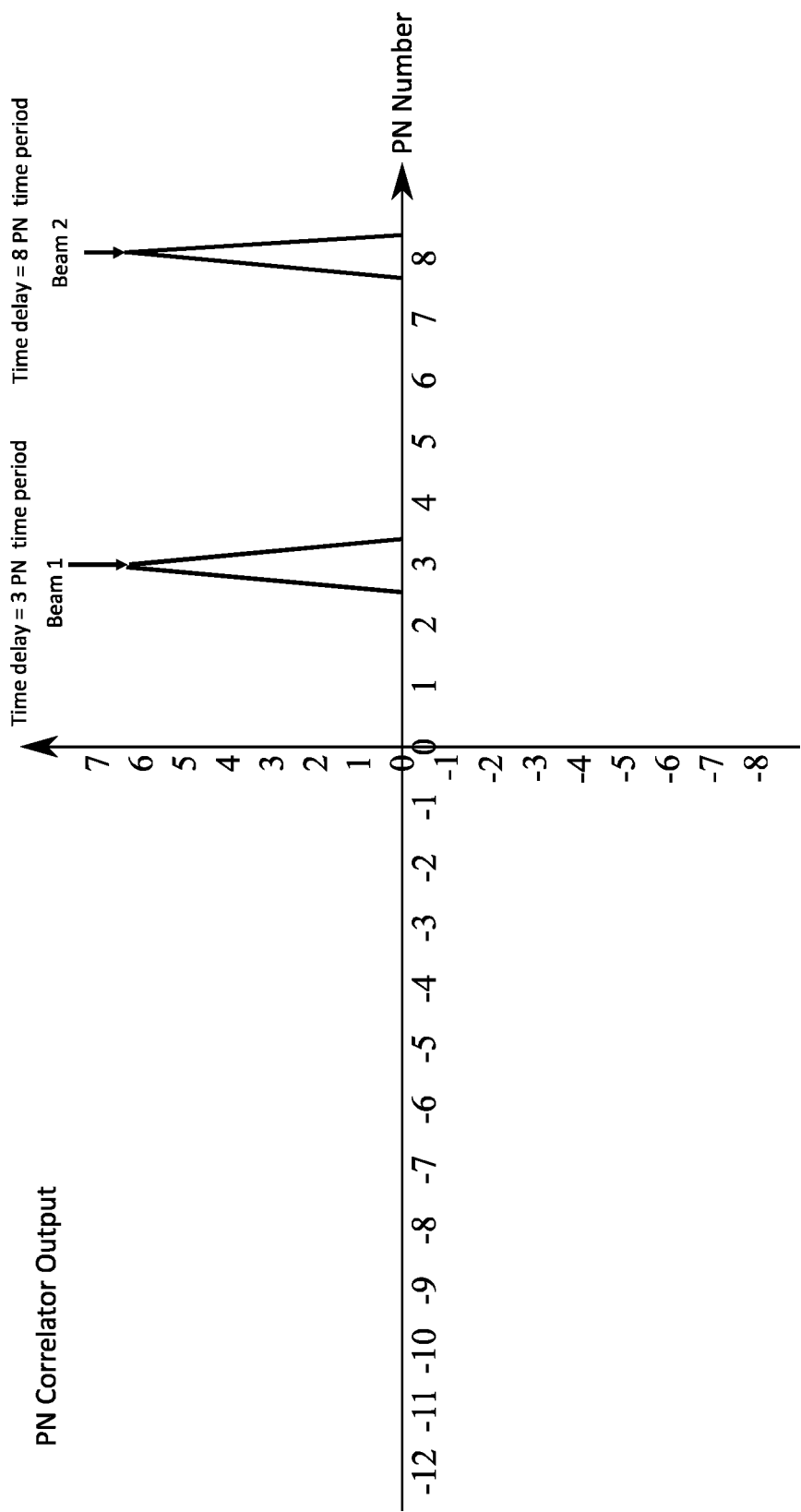
FIG. 12 is a graph showing the time delay as the PN time period in the X-axis.

Referring to FIG. 11 and FIG. 12, in one possible embodiment, the MIMO radar standardizes the time delay between each received beam and the corresponding transmitted beam in accordance to a PN clock time period. The PN clock time period refers to time required for the PN code to complete a full cycle. This allows for a convenient way of keeping track of the time delay of the plurality of received beams.

Figure 13:
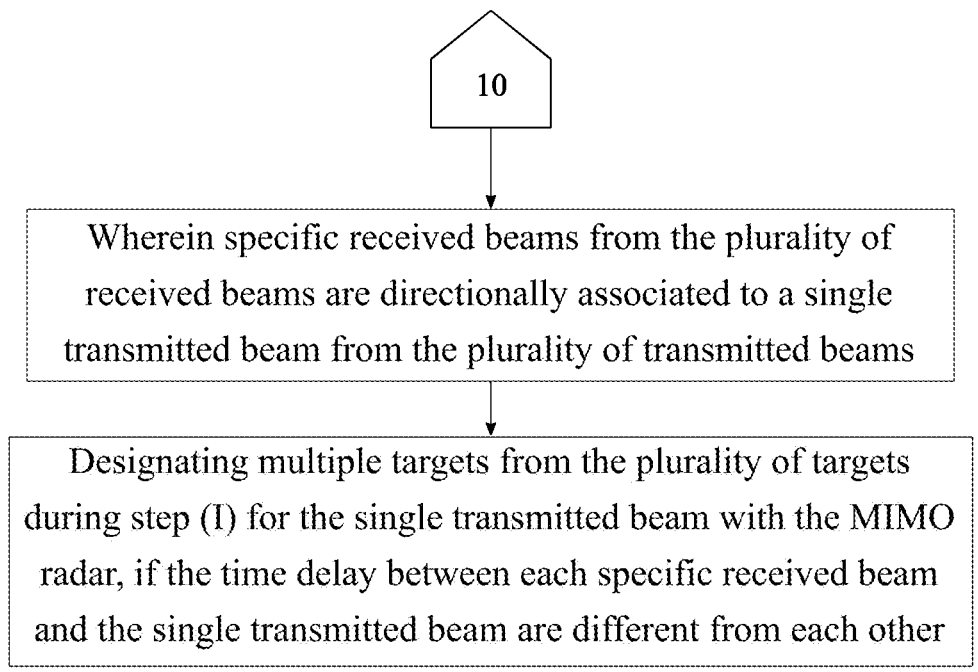
FIG. 13 is a flowchart of a subprocess for separating multiple targets found within a single received beam by the time delay of each target.
Figure 14:
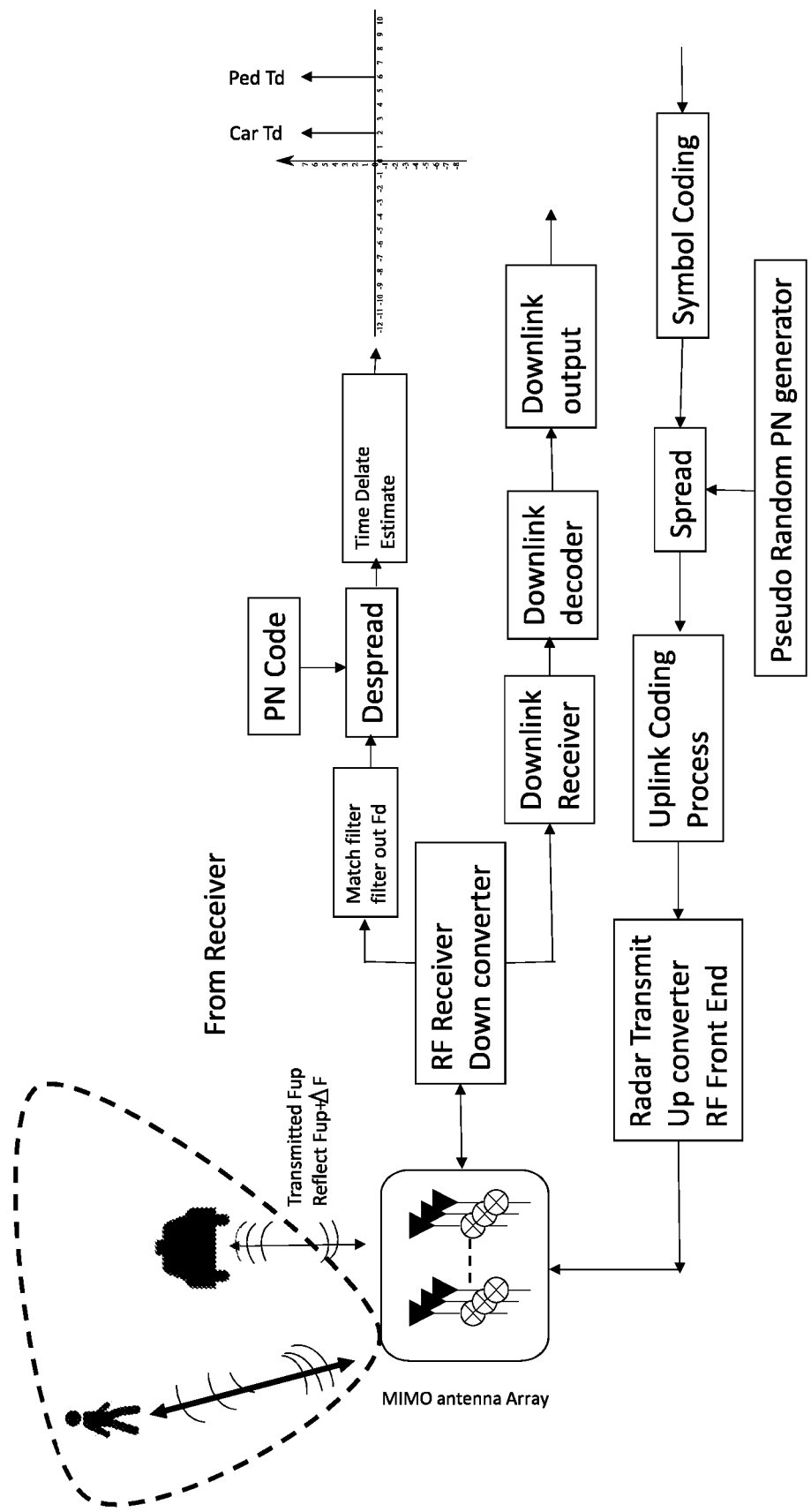
FIG. 14 is an schematic diagram showing the process for determining the time delays of targets found within a single received beam.

Referring to FIG. 13 and FIG. 14, in another possible embodiment, a plurality of targets may be detected within a single received beam. In this case, the MIMO radar uses the time delay to separately identify each target. Accordingly, specific received beams from the plurality of received beams are directionally associated to a single transmitted beam from the plurality of transmitted beams. Further, the MIMO radar designates multiple targets from the plurality of targets during Step I for the single transmitted beam, if the time delay between each specific received beam and the single transmitted beam are different from each other.

Although the invention has been explained in relation to its preferred embodiment, it is to be understood that many other possible modifications and variations can be made without departing from the spirit and scope of the invention as hereinafter claimed.

What is claimed is:

1. A method of implementing spread spectrum techniques in an automotive radar with wireless communication capabilities, the method comprises the steps of:
   (A) providing a MIMO radar and at least one base station;
   (B) encrypting an initial uplink signal with the MIMO radar;
   (C) transmitting the initial uplink signal from the MIMO radar to the base station;
   (D) receiving an ambient signal with the MIMO radar, wherein the ambient signal includes a reflected uplink signal and a downlink signal from the base station, and wherein the reflected uplink signal is associated to the initial uplink signal, and wherein the reflected uplink signal originates from objects surrounding the MIMO radar;
   (E) filtering the downlink signal from the ambient signal with the MIMO radar;
   (F) processing communication data from the downlink signal with the MIMO radar;
   (G) filtering the reflected uplink signal from the ambient signal with the MIMO radar;
   (H) decrypting the reflected uplink signal with the MIMO radar;
   (I) detecting a plurality of targets within the reflected uplink signal with the MIMO radar; and
   (J) deriving spatial positioning data for each target with the MIMO radar.

2. The method of implementing spread spectrum techniques in an automotive radar with wireless communication capabilities, the method as claimed in claim 1 comprises the steps of:
   providing the initial uplink signal as a plurality of transmitted beams;
   providing a spread spectrum coding scheme stored on the MIMO radar; and
   encoding each transmitted beam with the spread spectrum coding scheme during step (B).

3. The method of implementing spread spectrum techniques in an automotive radar with wireless communication capabilities, the method as claimed in claim 2 comprises the steps of:
   providing a pseudo-noise (PN) generator managed by the MIMO radar;
   generating a PN code with the PN generator; and
   spreading a frequency spectrum of each transmitted beam in accordance to the PN code with the MIMO radar.

4. The method of implementing spread spectrum techniques in an automotive radar with wireless communication capabilities, the method as claimed in claim 1 comprises the steps of:

providing the reflected uplink signal as a plurality of received beams;

providing a spread spectrum coding scheme stored on the MIMO radar; and decoding each received beam with the spread spectrum coding scheme during step (H).

5. The method of implementing spread spectrum techniques in an automotive radar with wireless communication capabilities, the method as claimed in claim 4 comprises the steps of:

providing a PN code stored on the MIMO radar; and de-spreading a frequency spectrum of each received beam in accordance to the PN code with the MIMO antenna.

6. The method of implementing spread spectrum techniques in an automotive radar with wireless communication capabilities, the method as claimed in claim 4 comprises the step of:

simultaneously decoding plurality of received beams with the spread spectrum coding scheme during step (H).

7. The method of implementing spread spectrum techniques in an automotive radar with wireless communication capabilities, the method as claimed in claim 1 comprises the steps of:

providing the initial uplink signal as a plurality of transmitted beams;

providing the reflected uplink signal as a plurality of received beams;

correlating a corresponding received beam among the plurality of received beams to a corresponding transmitted beam among the plurality of received beams with the MIMO radar; and performing step (J) by calculating a time delay between the corresponding received beam and the corresponding transmitted beam with the MIMO radar.

8. The method of implementing spread spectrum techniques in an automotive radar with wireless communication capabilities, the method as claimed in claim 7 comprises the step of:

standardizing the time delay between each received beam and the corresponding transmitted beam in accordance to a PN clock time period with the MIMO radar.

9. The method of implementing spread spectrum techniques in an automotive radar with wireless communication capabilities, the method as claimed in claim 7 comprises the steps of:

wherein specific received beams from the plurality of received beams are directionally associated to a single transmitted beam from the plurality of transmitted beams; and designating multiple targets from the plurality of targets during step (I) for the single transmitted beam with the MIMO radar, if the time delay between each specific received beam and the single transmitted beam are different from each other.

* * * * *